United States Patent [19]

Cheng

[11] Patent Number: 5,677,527

[45] Date of Patent: Oct. 14, 1997

[54] COMPENSATION METHOD AND APPARATUS FOR IMAGE SIGNALS GENERATED BY CCD

[75] Inventor: Peen-Pau Cheng, Hsin-Chu, Taiwan

[73] Assignee: Must Systems, Inc., Hsin-Chu, Taiwan

[21] Appl. No.: 541,044

[22] Filed: Oct. 11, 1995

[51] Int. Cl.$^6$ .................................................. H01J 40/14
[52] U.S. Cl. ........................ 250/208.1; 348/250; 348/294
[58] Field of Search ............................. 250/208.1, 208.2, 250/208.3, 208.6; 348/222, 229, 230, 241, 243, 250, 294

[56] References Cited

U.S. PATENT DOCUMENTS

| | | | |
|---|---|---|---|
| 5,550,651 | 8/1996 | Terajima | 250/208.1 |
| 5,585,621 | 12/1996 | Hayakawa | 250/208.1 |

*Primary Examiner*—Edward P. Westin
*Assistant Examiner*—John R. Lee
*Attorney, Agent, or Firm*—Bacon & Thomas

[57] ABSTRACT

The present invention is related to a compensation method for a series of synthesized image signals generated by a double-side readout type of CCD which includes the steps of: a) comparing the first two of the series of synthesized image signals with a reference signal to obtain a first and a second compensating signals, respectively; b) serially comparing each signal of the series of synthesized image signals with the reference signal to obtain a series of difference signals; and c) compensating the series of synthesized image signals according to the first and the second compensating signals and the difference signals, to make every two of the resulting series of synthesized image signals bearing consecutive ordinal numbers substantially equal to each other in potential level. The present invention also relates to a compensation apparatus for implementing the present compensation method.

17 Claims, 3 Drawing Sheets

COMPENSATION METHOD AND APPARATUS FOR IMAGE SIGNALS GENERATED BY CCD

FIELD OF THE INVENTION

The present invention is related to a compensated method, and more particularly to a compensated method for sensitized image signals generated by a CCD. The present invention also relates to an apparatus for executing the compensation of the sensitized image signals.

BACKGROUND OF THE INVENTION

Nowadays, it is more and more popular to use a charge coupled device (CCD) as an image sensing device. For example, CCD is widely applied to optical devices such as a scanner, a camera, etc. Generally speaking, the classifications of CCD include a single-side readout type of CCD and a double-side readout type of CCD. When the double-side readout type of CCD is used as the image sensing device, a problem called "curtain effect" or "even-and-odd effect" may be encountered so that the image quality will be seriously adversely influenced. The cause of the so-called curtain effect is the potential level difference existing between the series of sensitized image signals bearing odd ordinal numbers and the series of sensitized image signals bearing even ordinal numbers after the two series of signals are synthesized. That will result in defects in the synthesized image.

The curtain effect will be further illustrated hereinafter with reference to FIG. 1. FIG. 1 schematically shows a readout fashion of a series of sensitized image signals in a double-side readout type of CCD. In the drawing, labeling references S1, S3, S5 ... represent sensitizing units SOC bearing odd ordinal numbers, and S2, S4, S6 ... represent sensitizing units SEC bearing even ordinal numbers. Labeling reference SOR represents a register for a series of sensitized image signals bearing odd ordinal numbers and read out from the sensitizing units SOC, and SER represents a register for a series of sensitized image signals bearing even ordinal numbers and read out from the sensitizing units SEC. On the other hand, the numeral reference 1 represents a CCD image signal sensor, and the labeling references $\phi$, $\phi 1$ and $\phi 2$ are clock signals respectively provided for the CCD image signal sensor 1 and the registers SOR and SER.

As shown in FIG. 1, the series of sensitized image signals bearing odd ordinal numbers and the series of sensitized image signals bearing even ordinal numbers are read out from the sensitizing units SOC and SEC to be stored in the registers SOR and SER, respectively. Then, the CCD image signal sensor I alternately receives the two series of sensitized image signals from the registers SOR and SER signal by signal and outputs a series of synthesized image signals. Under this circumstance, there always be potential level difference between the signals outputted by the sensitizing units SOC and those outputted by the sensitizing units SEC so that uneven straight lines will appear in the output synthesized image, i.e. the so-called "curtain effect" will be caused. Unfortunately, most CCD manufacturers can only guarantee that the potential level difference between the two series of sensitized image signals respectively outputted from the registers SOR and SER is ranged within a small percentage ratio rather than that the curtain effect can be thoroughly avoided. Therefore, the improvement on the image quality by eliminating the curtain effect has been positively developed.

A conventional compensation apparatus for image signals generated by a CCD is shown in FIG. 2. The compensation apparatus shown in FIG. 2 includes a CCD image signal sensor 1, an analog subtracter 2, an analog adder 3, an auto-gain controller 4, an analog/digital converter 5, a digital/analog converter 6, a compensating signal storing device 7, a memory device 8 and a micro-controller 9. The analog subtracter 2 includes bias resistors R1~R4, amplifying resistors R and GR for amplifying the synthesized image signals by G times, and an operational amplifier 21 for signal subtraction. The working principle of the conventional compensation apparatus will be described as follows.

In general, the black level of the CCD is first determined to provide a potential level reference for various image signals. The term "black level" described herein means a basic potential level of the CCD before a target object is sensed. After receiving the two series of sensitized image signals SIS1 shown in FIG. 1, the CCD image signal sensor 1 outputs a series of synthesized image signals SIS2 from a first signal output terminal thereof and a reference signal RS from a second signal output terminal thereof. Basically, the potential level of the reference signal RS varies with the specifications of CCD image signal sensor 1 and generally ranged within 3~5V. In other words, different CCD image signal sensors are selected for different requirements for potential levels of reference signals in order to match with the black level. The series of synthesized image signals are transmitted to an analog subtracter 2 for serially proceeding subtraction operations with the reference signal RS to obtain a series of difference signals DS having potential levels approximating the black level. Further, the series of difference signals DS are transmitted to an analog adder 3 for serially adding thereto a compensating signal CS to obtain a series of compensated image signals under the control of the micro-controller 9. The compensating signal CS has a potential level substantially equal to the potential level difference between the two series of sensitized image signals, which depends on the specifications of the CCD and is stored in the compensating signal storing device 7. After finishing compensation operations, the compensated image signals are stored in the memory devices 8 for further access. The CCD image signal sensor 1 keeps on outputting synthesized image signals, and the previously determined reference signal RS and compensating signal CS are repetitively used for compensating the synthesized image signals.

As for the auto-gain controller 4, the analog/digital converter 5 and the digital/analog converter 6 shown in FIG. 2, they are well known elements to those skilled in the art and are not to be redundantly described here.

Even though the conventional compensation method and apparatus have been provided to reduce the potential level difference between the signals outputted by the sensitizing units SOC (i.e. the series of synthesized signals bearing odd ordinal numbers) and those outputted by the sensitizing units SEC (i.e. the series of synthesized signals bearing even odd ordinal numbers) to avoid the uneven straight lines appearing in the output synthesized image, i.e. the "curtain effect", there still exist shortcomings in the conventional method. For example, no matter for the synthesized image signals bearing odd ordinal numbers or those bearing even ordinal numbers, the same compensating signal is used for the compensation operations. As a result, in spite the compensated image signals approximate the black level, the potential level difference between the compensated image signals respectively bearing odd ordinal numbers and even ordinal numbers still exists. Accordingly, the curtain effect cannot be completely avoided.

SUMMARY OF THE INVENTION

An object of the present invention is to provide a compensation method, which compensates a first series of sensitized image signals and a second series of sensitized image signals, respectively, with two compensating signals.

Another object of the present invention is to provide a compensation apparatus, which generates compensated image signals approximating the black level and has every two compensated image signals bearing consecutive ordinal numbers substantially equal to each other in potential level.

In accordance with the present invention, a compensation method for a series of synthesized image signals generated by a double-side readout type of CCD includes steps of: a) serially comparing each signal of the series of synthesized image signals with a reference signal to obtain a series of difference signals; and b) compensating the series of difference image signals according to a first and a second compensating signals to make every two of the resulting series of compensated image signals bearing consecutive ordinal numbers substantially equal to each other in potential level.

In accordance with another aspect of the present invention, the reference signal is selected according to a black level of the CCD.

In accordance with another aspect of the present invention, the first and the second compensating signals are obtained via steps of: i) having the first two of a series of blank signals generated before a target object is sensed by the CCD respectively subtract therefrom the reference signal; and ii) reversing the resulting signals in the step i) to obtain the first and said second compensating signals.

In accordance with another aspect of the present invention, the comparing step a) is executed by serially subtracting the reference signal from each signal of the series of synthesized image signals.

In accordance with another aspect of the present invention, in the compensating step b), each signal of the series of difference signals bearing odd ordinal numbers is compensated by adding thereto the first compensating signal, and preferably each signal of the series of difference signals bearing even ordinal numbers is compensated by adding thereto the second compensating signal.

In accordance with another aspect of the present invention, the compensation apparatus for implementing the compensation method includes a CCD image signal sensor outputting the series of synthesized image signals by one output terminal thereof and the reference signal by another output terminal thereof, an analog subtracter electrically connected to the CCD image signal sensor and receiving the series of synthesized image signals and the reference signal for executing the comparing step a) to obtain the series of difference signals, a storing device storing therein the first and the second compensating signals, and an analog adder electrically connected to the comparing device and the storing device, and receiving the series of difference signals and the first and the second compensating signals for executing the compensating step b) to make every two of the resulting series of compensated image signals bearing consecutive ordinal numbers substantially equal to each other in potential level.

In accordance with another aspect of the present invention, the CCD image signal sensor includes a sensing IC (integrated circuit). In this case, a potential level of the reference signal varies with specifications of the sensing IC.

In accordance with another aspect of the present invention, the storing device includes a first and a second storing unit for storing therein the first and the second compensating signals, respectively. Each of the first and the second storing units can be a memory buffer.

In accordance with another aspect of the present invention, the compensation apparatus preferably further includes a digital/analog converter electrically connected to the first and the second memory buffers for converting the first and the second compensating signals outputted from the first and the second memory buffers into analog signals.

In accordance with another aspect of the present invention, the compensation apparatus preferably further includes a multiplexer for selectively providing the first and the second compensating signals respectively from the first and the second storing units for the series of difference signals bearing alternate odd and even ordinal numbers.

In accordance with another aspect of the present invention, the compensation apparatus preferably further includes a micro-controller, e.g. a single chip, electrically connected to the analog adder and the first and the second storing units for determining which compensating signal is to be outputted through the multiplexer.

In accordance with another aspect of the present invention, the compensation apparatus preferably further includes a memory device electrically connected to the analog adder and the micro-controller for storing therein the resulting series of compensated image signals.

In accordance with another aspect of the present invention, the compensation apparatus preferably further includes an auto-gain controller and an analog/digital converter which are electrically connected between the analog adder and the memory device for amplifying and converting the resulting series of compensated image signals.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
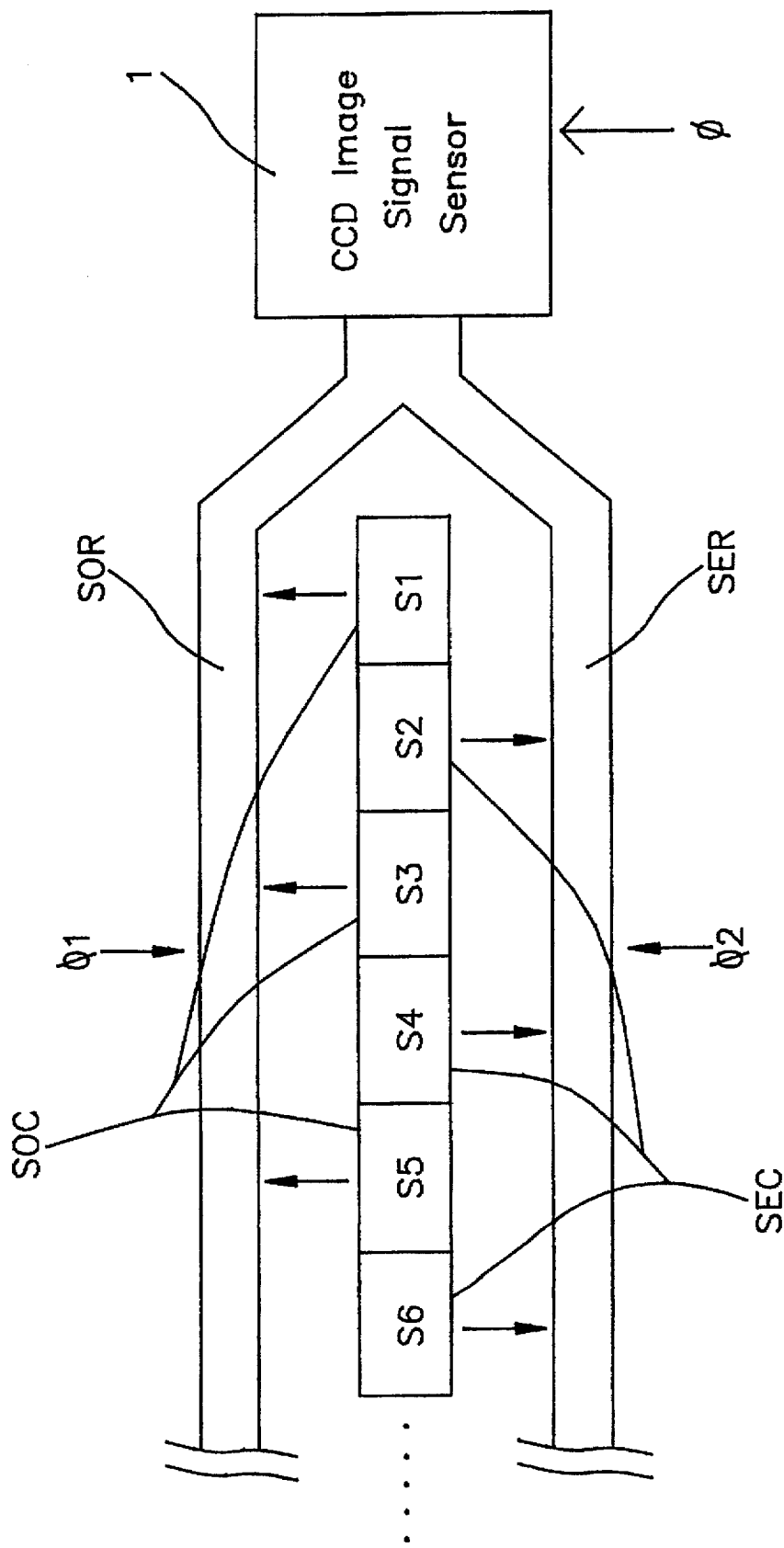
FIG. 1 schematically shows a readout fashion of a series of sensitized image signals in a double-side readout type of CCD.
Figure 3:
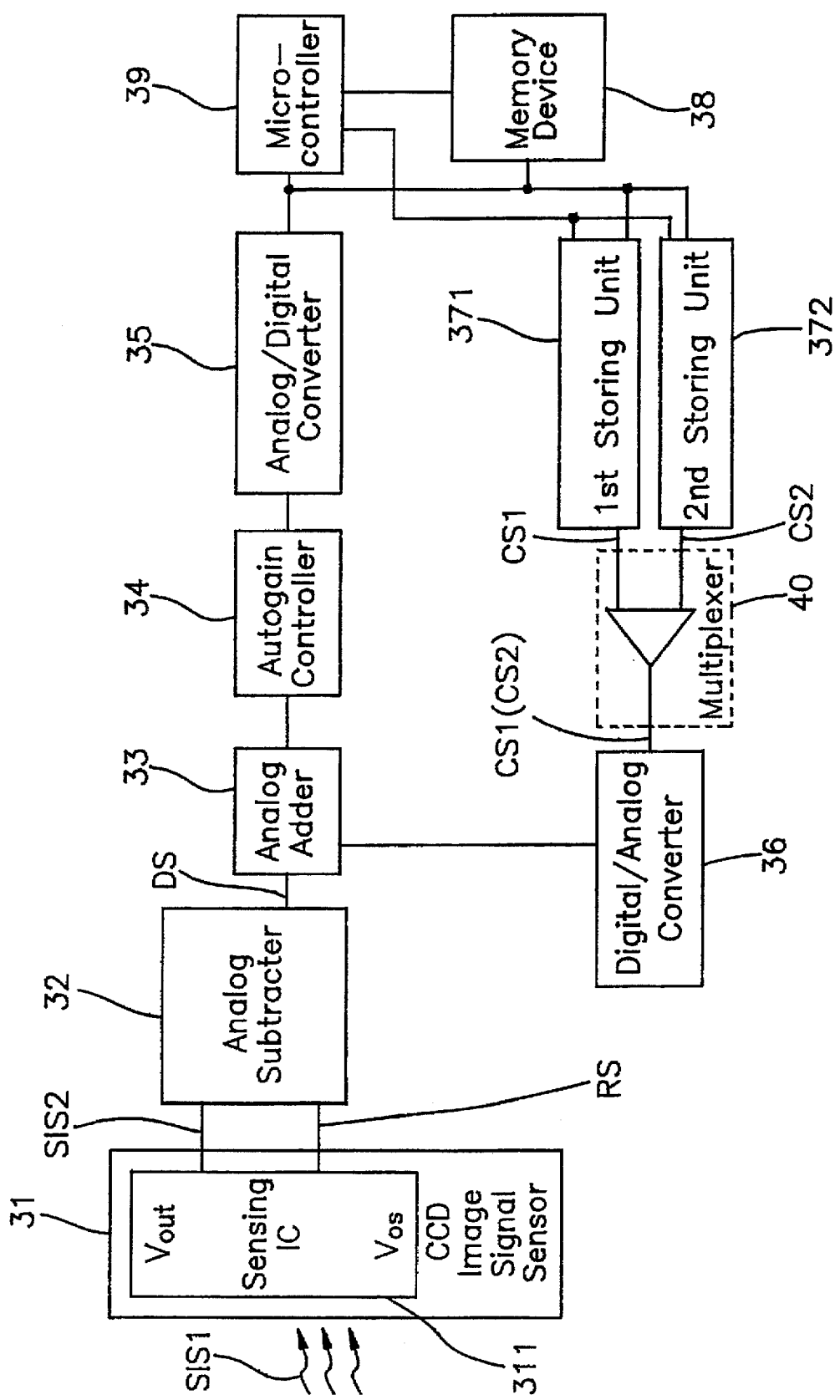
FIG. 3 is a schematic block diagram showing a preferred embodiment of a compensation apparatus for a series of synthesized image signal generated by a double-side readout type of CCD according to the present invention.

Please refer to FIG. 3 which schematically shows a preferred embodiment of a compensation apparatus according to the present invention. Referring to FIG. 1 again, the two series of sensitized image signals respectively bearing odd and even ordinal numbers are synthesized as a series of synthesized image signals and the series of synthesized image signals are transmitted through the present apparatus for compensation operations.

Figure 2:
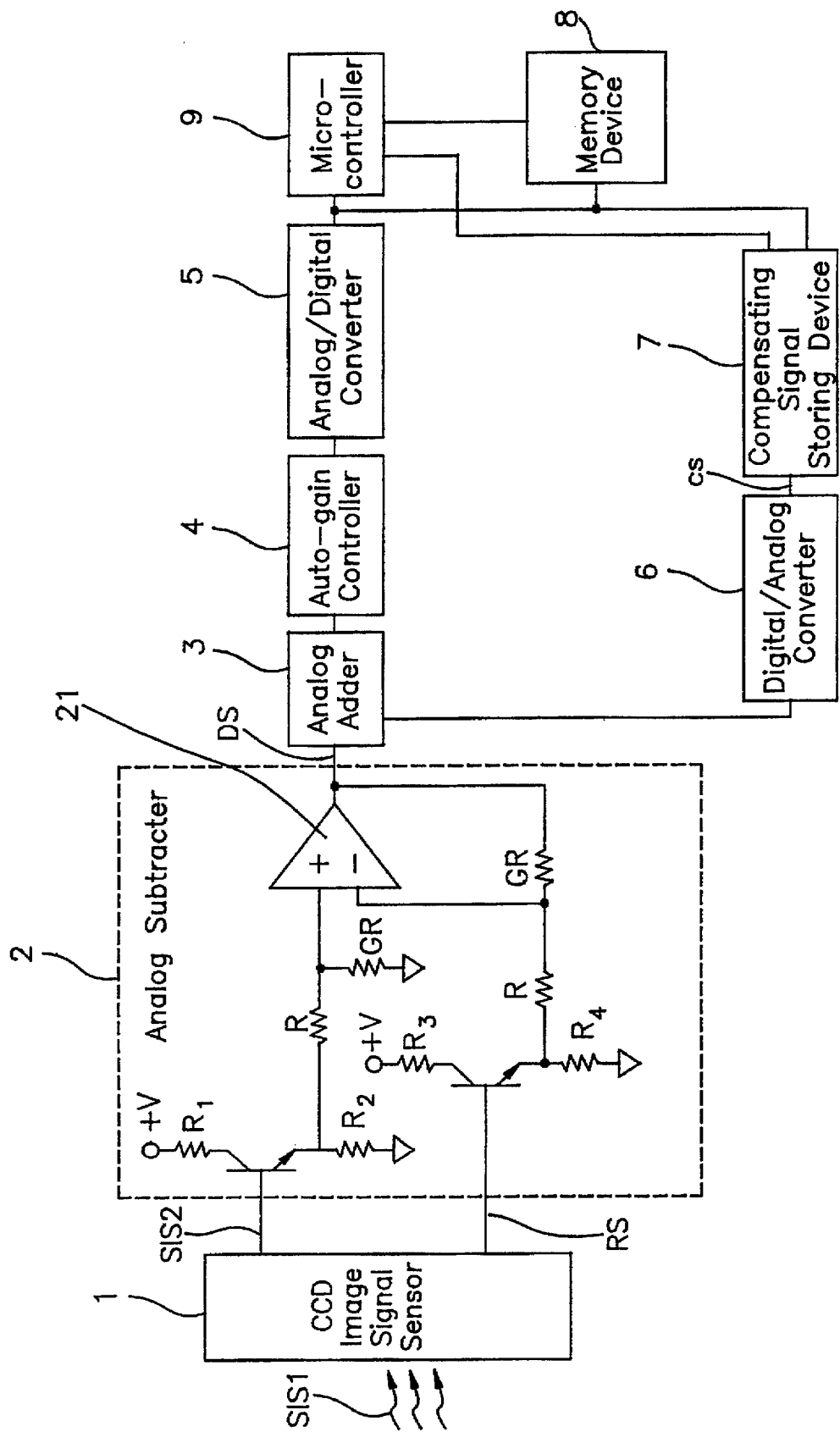
FIG. 2 is a schematic block diagram showing a conventional compensation apparatus for a series of synthesized image signals generated by a double-side readout type of CCD.

The compensation apparatus shown in FIG. 3 includes a CCD image signal sensor 31 including a sensing IC 311, an analog subtracter 32, an analog adder 33, an auto-gain controller 34, an analog/digital converter 35, a digital/analog converter 36, a storing device 37 including two memory buffers 371 and 372, a memory device 38, a micro-controller 39, and a multiplexer 40. Basically, the analog subtracter 32, analog adder 33, auto-gain controller 34, analog/digital converter 35, digital/analog converter 36, memory device 38, and micro-controller 39, e.g. a single chip, can be the same as those devices 2, 3, 4, 5, 6, 8 and 9 of the conventional compensation apparatus shown in FIG. 2 and perform the same functions. The present compensation method will be described as follows with reference to FIG. 3.

The black level of the CCD is first determined to provide a potential level reference for various image signals. After receiving sensitized image signals SIS1, the sensing IC 311 of the CCD image signal sensor 31 outputs a series of synthesized image signals SIS2 from a first signal output terminal thereof and a reference signal RS from a second signal output terminal thereof. Substantially, the reference signal RS is a kind of calibrating signal for approximating the black level and the potential level of the reference signal varies with the specifications of the sensing IC 311. The potential level is generally ranged within 3~5V. Each signal of the series of synthesized image signals is then serially transmitted to an analog subtracter 32 for subtracting the reference signal RS therefrom to obtain a series of difference signals DS having potential levels approximating the black level. Further, each signal of the series of difference signals DS is serially transmitted to an analog adder 33 for adding thereto a first or a second compensating signal CS1 or CS2, wherein the two compensating signals are respectively stored in the first and the second memory buffers 371 and 372, to obtain a series of compensated image signals under the control of the micro-controller 39. According to a preferred embodiment of the present method, the first compensating signal CS1 is added to each signal of the series of difference signals DS bearing odd ordinal numbers, while the second compensating signal CS2 is added to each signal of the series of difference signals DS bearing even ordinal numbers. In other words, the micro-controller 39 alternately enables the first and the second memory buffers 371 and 372 according to the alternate odd and even ordinal numbers of the series of difference signals DS to alternatively output the first and the second compensating signals CS1 and CS2 for respectively compensating the series of difference signals DS bearing alternate odd and even ordinal numbers. Of course, it is preferred that a 2-on-1 multiplexer 40 is used for selectively allowing one of the first and the second compensating signals CS1 and CS2 to be transmitted therethrough. Thus, the compensating signals CS1 and CS2 can be alternately and repetitively used for compensating the series of difference signals DS in the analog adder 33 to obtain the series of compensated image signals which approximates the black level and in which the signals bearing odd ordinal numbers equal to those bearing even ordinal numbers in potential level. The series of compensated image signals are amplified through the auto-gain controller 34, converted into digital signals through the analog/digital converter 35, and then stored in the memory device 38.

The determination of the compensating signals CS1 and CS2 will be described hereinafter. Before there is any signal transmitted from the CCD into the present compensation apparatus, the first and the second compensating signals CS1 and CS2 are temporarily set to be zero signals. When a series of blank signals are inputted into the present compensation apparatus, the first and the second blank signals thereof are provided for determining the true first and the second compensating signals. The first and the second blank signals respectively subtract the reference signal RS therefrom through the analog subtracter 32 in the beginning, and then transmitted the analog adder 33 for respectively adding thereto the temporary compensating signals, i.e. zero signals. The resulting output signals from the analog adder 33 is reversed by the micro-controller 39 and substitutes for the zero signals as the first and the second compensating image signals CS1 and CS2 to be stored in the memory buffers 371 and 372 for the subsequent compensation operations. Because the first and the second compensating signals CS1 and CS2 stored in the memory buffers are digital signals, they should be converted into analog ones through the digital/analog converter 36 before they are transmitted into the analog adder 33.

Now, an example is given to illustrate the present invention more clearly. It is to be noted that potential levels are used hereinafter for facilitating the description of subtraction or addition calculation.

First of all, presuming that the black level is 0V, and the potential levels of the first and the second blank signals are 5.3V and 5.1V, respectively, then the potential level of the reference signal should preferably be set to 5V. After passing the above signals through the analog subtracter 32, two difference signals respectively with potential levels of 0.3V and 0.1V are obtained according to the following calculations:

$$5.3V - 5V = 0.3V$$

$$5.1V - 5V = 0.1V$$

Meanwhile, the temporary first and second compensating signals stored in the first and second storing units 371 and 372 are alternately transmitted through the multiplexer 40 to be added to the two difference signals in the analog adder 33, respectively.

$$0.3V + 0V = 0.3V$$

$$0.1V + 0V = 0.1V$$

The above results are then reversed by the micro-controller 38 to become -0.3V and -0.1V and substitute for the potential levels 0V and 0V to serve as the first and the second compensating signals, respectively, and be stored in the storing units 371 and 372.

If the subsequent blank signals in which the signals bearing odd ordinal numbers have a potential level of 5.3V and the signals bearing even ordinal numbers have a potential of 5.1V are inputted to the present compensation apparatus to be compensated, the obtained compensated signals will have potential levels approximating the black level and the compensated signals bearing consecutive ordinal numbers will substantially equal to each other, as expressed below.

The signals bearing odd ordinal numbers:

$$5.3V - 5V = 0.3V \ldots \text{(potential level of difference signal)}$$

$$0.3V + (-0.3V) = 0V \ldots \text{(potential level of compensated signal)}$$

The signals bearing even ordinal numbers:

$$5.1V - 5V = 0.1V \ldots \text{(potential level of difference signal)}$$

$$0.1V + (-0.1V) = 0V \ldots \text{(potential level of compensated signal)}$$

Thereafter, if a target object is sensed by the CCD and two sensitized image signals respectively having potential levels of 4.7V and 4.5V are transmitted into the present compensation apparatus, the following calculation will be performed.

The signals bearing odd ordinal numbers:

$$4.7V - 5V = -0.3V \ldots \text{(potential level of difference signal)}$$

$$-0.3V + (-0.3V) = -0.6V \ldots \text{(potential level of compensated signal)}$$

The signals bearing even ordinal numbers:

$$4.5V - 5V = -0.5V \ldots \text{(potential level of difference signal)}$$

$$-0.5V + (-0.1V) = -0.6V \ldots \text{(potential level of compensated signal)}$$

Thereby, both of the two compensated signals have the same potential levels of -0.6V and -0.6V approximating the black level.

To sum up, the compensating signals used in the present invention are automatically obtained and adjusted according to the blank signals rather than unchangeablly set to a predetermined value. In other words, if the difference between the blank signals bearing odd ordinal numbers and the blank signals bearing even ordinal numbers is changed, the compensating signals will be adjusted accordingly so that the compensated signals can always approximate the black level and the compensated signals bearing consecutive ordinal numbers can always equal to each other in potential level. By this way, the curtain effect can be avoided and the image quality can be improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A compensation method for a series of synthesized image signals generated by a double-side readout type of CCD, comprising steps of:
   a) serially comparing each signal of said series of synthesized image signals with a reference signal to obtain a series of difference signals; and
   b) compensating said series of difference signals according to a first and a second compensating signal to make every two of the resulting series of compensated image signals bearing consecutive ordinal numbers substantially equal to each other in potential level.

2. A compensation method according to claim 1 wherein said reference signal is selected according to a black level of said CCD.

3. A compensation method according to claim 1 wherein said first and said second compensating signals are obtained via steps of:
   i) having the first two of a series of blank signals generated before a target object is sensed by said CCD and respectively subtracting therefrom said reference signal; and
   ii) reversing the resulting signals in said step i) to obtain said first and said second compensating signals.

4. A compensation method according to claim 3 wherein said comparing step a) is executed by serially subtracting said reference signal from each signal of said series of synthesized image signals.

5. A compensation method according to claim 4 wherein in said compensating step b), each signal of said series of difference signals bearing odd ordinal numbers is compensated by adding thereto said first compensating signal.

6. A compensation method according to claim 5 wherein in the compensating step b), each signal of said series of difference signals bearing even ordinal numbers is compensated by adding thereto said second compensating signal.

7. A compensation apparatus for implementing the compensation method as claimed in claim 6, comprising:
   a CCD image signal sensor outputting said series of synthesized image signals by one output terminal thereof and said reference signal by another output terminal thereof;
   an analog subtracter electrically connected to said CCD image signal sensor for receiving said series of synthesized image signals and said reference signal for executing said comparing step a) to obtain said series of difference signals;
   a storing device storing therein said first and said second compensating signals; and
   an analog adder electrically connected to said analog adder and said storing device, for receiving said series of difference signals and said first and said second compensating signals for executing said compensating step b) to make every two of the resulting series of compensated image signals bearing consecutive ordinal numbers substantially equal to each other in potential level.

8. A compensation apparatus according to claim 7 wherein said CCD image signal sensor includes a sensing integrated circuit.

9. A compensation apparatus according to claim 8 wherein a potential level of said reference signal varies with specifications of said sensing integrated circuit.

10. A compensation apparatus according to claim 7 wherein said storing device includes a first and a second storing unit for storing therein said first and said second compensating signals, respectively.

11. A compensation apparatus according to claim 10 wherein each of said first and said second storing units is a memory buffer.

12. A compensation apparatus according to claim 11 further comprising a digital/analog converter electrically connected to said first and said second memory buffers for converting said first and said second compensating signals outputted from said first and said second memory buffers into analog signals.

13. A compensation apparatus according to claim 10 further including a multiplexer for selectively providing said first and said second compensating signals respectively from said first and said second storing units for said series of difference signals bearing alternate odd and even ordinal numbers.

14. A compensation apparatus according to claim 13 further comprising a micro-controller electrically connected to said analog adder and said first and said second storing units for determining which compensating signal is to be outputted through said multiplexer.

15. A compensation apparatus according to claim 14 wherein said micro-controller is a single chip.

16. A compensation apparatus according to claim 13 further comprising a memory device electrically connected to said analog adder and said micro-controller for storing therein said compensated series of synthesized image signals.

17. A compensation apparatus according to claim 16 further comprising an auto-gain controller and an analog/digital converter which are electrically connected between said analog adder and said memory device for amplifying and converting said resulting series of compensated image signals.

* * * * *